United States Patent

Quandt

[15] 3,655,354
[45] Apr. 11, 1972

[54] GRAPHITE CRUCIBLES FOR USE IN PRODUCING HIGH QUALITY QUARTZ

[72] Inventor: Herbert C. Quandt, Lakewood, Ohio
[73] Assignee: Union Carbide Corporation
[22] Filed: May 23, 1968
[21] Appl. No.: 731,616

[52] U.S. Cl. .................................. 65/24, 23/301, 65/33, 65/DIG. 8
[51] Int. Cl. ................................................. C03b 39/00
[58] Field of Search .................. 263/48; 117/5.1, 21, 121; 65/24, 33, 26, 374; 23/292, 252 A, 301 SP; 27/273 SP

[56] References Cited

UNITED STATES PATENTS

| 2,726,487 | 12/1965 | Cummins et al. | 65/DIG. 8 |
| 1,249,636 | 12/1917 | Keyes | 263/48 |
| 2,685,539 | 8/1954 | Woodburn | 117/5.1 |
| 2,685,540 | 8/1954 | Woodburn | 117/5.1 |
| 3,180,632 | 4/1965 | Katz | 117/5.1 |
| 3,320,045 | 5/1967 | Weiss et al. | 65/33 |

OTHER PUBLICATIONS

Mantell, Industrial carbon, second edition 1946 pages 349, 350.

*Primary Examiner*—Norman Yudkoff
*Assistant Examiner*—S. Silverberg
*Attorney*—Paul A. Rose, Robert C. Cummings and John S. Piscitello

[57] ABSTRACT

An improved graphite crucible suitable for fusing quartz particles to produce quartz boules of high quality produced by treating a crucible manufactured from highly oriented graphite stock of high purity and high permeability with a solution of a metal salt such as aluminum chloride. Quartz boules produced in such crucibles have been found to have a significantly lower bubble content and to be less adherent thereto than quartz boules produced in untreated crucibles made from similar graphite stock.

4 Claims, No Drawings

GRAPHITE CRUCIBLES FOR USE IN PRODUCING HIGH QUALITY QUARTZ

BACKGROUND OF THE INVENTION

1. Field of the Invention

This invention relates to improved graphite crucibles for use in producing quartz boules. More particularly, this invention relates to graphite crucibles treated with solutions of salts of aluminum or other metals for use in the production of quartz boules of higher quality.

2. Description of the Prior Art

In the past quartz boules have been produced by fusing smaller particles of high quality, transparent quartz silica in a graphite crucible under vacuum at temperatures of from about 1,800° C. to about 2,000° C. However, the quartz billets formed in this manner were often of unsatisfactory quality because of a high bubble content and tended to adhere to the crucible on cooling. This adhesion made it difficult to remove the billets from the crucible without chipping them.

Attempts have been made to improve the quality of quartz boules manufactured in this manner and reduce their adhesion to the container in which they are produced by conducting fusion in crucibles manufactured from highly oriented graphite stock of high purity. While these attempts have met with some degree of success, they have not fully solved the problem.

SUMMARY OF THE INVENTION

In accordance with the instant invention an improved crucible suitable for fusing quartz particles to produce quartz boules of high quality is produced by treating a crucible formed from highly oriented graphite stock of high purity and high permeability with a solution of a salt of aluminum or other metal as hereinafter described. Quartz boules produced in such crucibles have been found to have a significantly lower bubble content and to be less adherent thereto than quartz boules produced in untreated crucibles made from similar graphite stock. Although the exact manner in which such treatment decreases the bubble content of the quartz and lessens its adhesion to the crucible is not fully understood, it is believed to be due at least in part to reaction between the metal salt and the quartz at the quartz-graphite interface during processing. The reaction produces a metal silicate which deposits on or near the surface of the crucible and reduces wetting of the crucible by the quartz. Other materials, such as elemental silicon and silicon carbide, are produced as byproducts of the reaction and deposited along with the metal silicate.

DESCRIPTION OF THE PREFERRED EMBODIMENT

Treatment of a graphite crucible with a metal salt solution according to the instant invention can be effected in any manner which will effectively introduce the metal salt into the graphite pores, at least near the surface of the crucible. Most conveniently this is accomplished by simply soaking the crucible in a solution of the metal salt for a time sufficient to allow the crucible to absorb a desired amount of the metal salt solution. Generally, the crucible should be allowed to soak until it has absorbed sufficient solution to contain, after removal of solvent, from about 10 parts per million to about 200 parts per million, preferably from about 20 parts per million to about 60 parts per million, of the metal present in the metal salt. Crucibles containing less than about 10 parts per million of such metal do not improve quartz properties to any significant degree, while crucibles containing more than about 200 parts per million of metal tend to cause conversion of the quartz into cristobalite, another crystalline but undesirable form of silica. Soaking for about 0.1 hour to about 2 hours, preferably from about 0.5 hour to about 1 hour, in a solution containing from about 0.1 per cent by weight to about 4 per cent by weight, preferably from about 0.25 per cent by weight to about 1 percent by weight, of the metal salt is generally effective for this purpose. As an aid to impregnation, use may be made of conventional surfactants or wetting agents. After a sufficient amount of the solution has been absorbed, the crucible is heated to effect removal of the solvent. If desired, other conventional methods of applying coatings may be employed in place of soaking, e.g., slurry coating, flame spraying, vacuum-pressure techniques, and the like.

After application of the coating and removal of solvent, the crucible can be employed in the fusion of quartz in the same manner as untreated graphite crucibles. Fusion under vacuum at temperatures of from about 1,800° C. to about 2000° C. is suitable.

Any soluble aluminum salt capable of reacting with quartz under the processing conditions employed in producing quartz boules to produce aluminum silicate can be employed according to the invention. While water is the preferred solvent, any inert solvent capable of introducing the aluminum salt into the graphite pores can be employed. The aluminum chloride salts are preferred, particularly aluminum chloride hexahydrate, but other aluminum salts such as aluminum nitrate, aluminum acetate, and the like, are also suitable. Soluble salts of other metals capable of reacting with quartz to produce metal silicates having high melting points which will reduce wetting of the crucible by the quartz can also be employed, including the salts of such metals as magnesium, calcium, beryllium, zirconium and hafnium.

The graphite crucible which is treated with a metal salt solution according to the invention should be formed from a highly oriented graphite stock having a high purity and high permeability. The high purity helps to reduce discoloration and adhesion of the quartz boule while the high permeability helps reduce the bubble content of the boule by permitting the diffusion of gaseous products. Graphite having an ash content no higher than about 200 parts per million at 680° C. and a gas flow permeability greater than about 30 milli Darcys is suitable. For best results, the graphite stock employed should have a gas flow permeability greater than about 50 milli Darcys and should be purified to an ash content no higher than about 50 parts per million at 680° C.

The following examples are set forth for purposes of illustration so that those skilled in the art may better understand this invention, and it should be understood that they are not to be construed as limiting the invention in any manner. Gas flow permeability as used in the examples and throughout the specification is defined by the equation $$K = \frac{Q \cdot \mu \cdot L}{\Delta P_c \cdot A}$$

wherein $K$ = permeability of the graphite in milli Darcys, $Q$ = rate of flow of the gas through a graphite sample in cubic centimeters per second, $\mu$ = viscosity of the gas in centipoises, $L$ = length of the graphite sample in centimeters, $A$ = cross sectional area of the graphite in square centimeters, and $\Delta P_c$ = decrease in pressure of the gas when forced through the sample measured in atmospheres and corrected for barometric pressure. The gas flow permeability was determined by forcing gaseous nitrogen through a 2 inches × 2 inches × 2 inches graphite sample from top to bottom, measuring the viscosity and rate of flow of the gas and its decrease in pressure when forced through the graphite sample, and substituting these values in the above formula.

EXAMPLE 1

A graphite crucible 3 ¼ inches high and having a ½ inches thick base and an outer diameter of 1 ¾ inches with walls 3/16 inch thick was purified with chlorine to an ash content of less than 10 parts per million (at 680° C.). The crucible was formed from highly oriented graphite having a permeability of about 100 milli Darcys.

The purified crucible was immersed in an aqueous solution containing 0.5 percent by weight of aluminum chloride hexahydrate and allowed to soak for two hours. The crucible was then removed from the solution and dried by heating at a temperature of 110° C. for sixteen hours. Chemical analysis indicated an aluminum content of 50 parts per million, based on the weight of purified graphite.

About seventy (70) grams of quartz granules (approximately 35 mesh) were placed in the crucible and heated under a vacuum to 1,850° C. to fuse the silica. Upon cooling to room temperature, the resulting boule was easily removed from the graphite crucible without chipping.

When the procedure was repeated employing an identical crucible which had not been treated with aluminum chloride solution as described above, the resulting boule could not be removed therefrom without chipping the quartz and had a significantly higher bubble content than the boule prepared in the treated crucible. This demonstrated that the boule formed in the treated crucible was of much higher quality.

EXAMPLE 2

A graphite crucible 3 ¼ inches high and having a ½ inch thick base and an outer diameter of 1 ¾ inches with walls 3/16 inch thick was purified with chlorine to an ash content of less than 10 parts per million (at 680° C.). The crucible was formed from highly oriented graphite having a permeability of about 100 milli Darcys and weighed 72.205 grams after purification.

The purified crucible was immersed in an aqueous solution containing 4.0 per cent by weight of magnesium acetate and allowed to soak for 2 hours. The crucible was then removed from the solution and dried by heating at a temperature of 110° C. for 16 hours. The weight increase of the crucible as a result of this treatment was 0.025 grams, representing a magnesium content of 38 parts per million, based on the weight of purified graphite.

About seventy (70) grams of quartz granules (approximately 35 mesh) were placed in the crucible and heated under a vacuum to 1,850° C. to fuse the silica. Upon cooling to room temperature, the resulting boule was removed from the graphite crucible without chipping.

When the procedure was repeated employing an identical crucible which had not been treated with magnesium acetate solution as described above, the resulting boule could not be removed therefrom without chipping the quartz and had a higher bubble content than the boule prepared in the treated crucible. This demonstrated that the boule formed in the treated crucible was of higher quality.

What is claimed is:

1. In a process for producing quartz boules by fusing quartz particles in a graphite crucible at a temperature of from 1,800° C. to 2,000° C., the improvement which comprises conducting the fusion in a crucible composed of highly oriented graphite stock having an ash content no higher than 200 parts per million at 680° C. and a gas flow permeability greater than 30 milli Darcys and containing in the graphite pores near the surface thereof a metal salt capable of reacting with quartz to produce a metal silicate, said metal salt being selected from the group consisting of the salts of aluminum and magnesium and being present in an amount such that the crucible contains from 10 parts per million to 200 parts per million of the metal present in said metal salt, cooling to room temperature and removing boules of crystalline quartz.

2. A process as in claim 1 wherein the metal salt is water soluble.

3. A process as in claim 1 wherein the metal salt is aluminum chloride hexahydrate.

4. A process as in claim 1 wherein the metal salt is magnesium acetate.

* * * * *